(12) United States Patent
Fan

(10) Patent No.: US 9,112,329 B2
(45) Date of Patent: Aug. 18, 2015

(54) THULIUM LASER

(71) Applicant: Tso Yee Fan, Belmont, MA (US)

(72) Inventor: Tso Yee Fan, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/949,864

(22) Filed: Jul. 24, 2013

(65) Prior Publication Data

US 2015/0029581 A1    Jan. 29, 2015

(51) Int. Cl.
| | |
|---|---|
| H01S 3/131 | (2006.01) |
| H01S 3/16 | (2006.01) |
| H01S 3/092 | (2006.01) |
| H01S 3/094 | (2006.01) |
| H01S 3/0941 | (2006.01) |
| H01S 3/11 | (2006.01) |
| H01S 3/04 | (2006.01) |
| H01S 3/042 | (2006.01) |

(52) U.S. Cl.
CPC ............... *H01S 3/1616* (2013.01); *H01S 3/042* (2013.01); *H01S 3/0407* (2013.01); *H01S 3/092* (2013.01); *H01S 3/09403* (2013.01); *H01S 3/09415* (2013.01); *H01S 3/11* (2013.01); *H01S 3/1643* (2013.01); *H01S 3/1696* (2013.01); *H01S 3/1698* (2013.01)

(58) Field of Classification Search
CPC ........ H01S 3/1616; H01S 3/063; H01S 3/131
See application file for complete search history.

(56) References Cited

U.S. PATENT DOCUMENTS

| | | | |
|---|---|---|---|
| 4,761,786 A | 8/1988 | Baer | |
| 4,890,289 A | 12/1989 | Basu et al. | |
| 4,969,150 A | 11/1990 | Esterowitz et al. | |
| 4,969,154 A | 11/1990 | Esterowitz et al. | |

(Continued)

OTHER PUBLICATIONS

Peterka et a. "Theoretical modeling of fiber laser at 810 nm based on thulium-doped silica fibers with enhanced 3H4 level lifetime" Optics express, vol. 19, No. 3, 2773-2781, (Jan. 28, 2011).*

(Continued)

*Primary Examiner* — Eric Bolda
(74) *Attorney, Agent, or Firm* — Cooley LLP

(57) ABSTRACT

Stimulating emission via thulium's lasing transition from the $^3H_4$ manifold to the $^3H_6$ manifold yields light at wavelength of about 820 nm. Unfortunately, excited thulium ions also transition from the $^3H_4$ manifold to the long-lived $^3F_4$ manifold, where they become trapped and can no longer participate in the lasing transition. If the enough of the thulium population becomes trapped in the $^3F_4$ manifold, the gain medium becomes transparent at the pump wavelength, rendering population inversion difficult or impossible. Fortunately, the size of the population in the $^3F_4$ manifold can be limited by selecting an appropriate crystal host and thulium doping concentration, pumping the thulium with pulses shorter than the $^3F_4$ manifold's lifetime, cooling the gain medium to low temperature (e.g., 77 K), stimulating emission from the $^3F_4$ manifold, upconversion pumping of the thulium from the $^3F_4$ manifold to the $^3H_4$ manifold, or transferring energy from thulium in the $^3F_4$ manifold to a co-dopant.

35 Claims, 6 Drawing Sheets

(56) References Cited

U.S. PATENT DOCUMENTS

| | | | |
|---|---|---|---|
| 5,140,598 A * | 8/1992 | Tagawa et al. | 372/6 |
| 5,289,482 A | 2/1994 | Esterowitz et al. | |
| 5,381,433 A | 1/1995 | Esterowitz et al. | |
| 6,400,495 B1 | 6/2002 | Zayhowski | |
| 6,411,432 B1 * | 6/2002 | Kasamatsu | 359/341.33 |
| 6,501,596 B1 * | 12/2002 | Inoue et al. | 359/341.5 |
| 6,650,400 B2 * | 11/2003 | Maroney et al. | 359/341.5 |
| 6,650,670 B1 | 11/2003 | Shimoji | |
| 6,859,480 B2 | 2/2005 | Phua et al. | |
| 7,493,008 B2 | 2/2009 | Barbosa et al. | |
| 7,755,745 B2 | 7/2010 | Urata et al. | |
| 8,284,812 B2 | 10/2012 | Young et al. | |
| 2003/0231380 A1 * | 12/2003 | Gomes et al. | 359/341.3 |
| 2006/0165145 A1 | 7/2006 | Krupke | |
| 2009/0201966 A1 | 8/2009 | Hirth et al. | |
| 2010/0074281 A1 * | 3/2010 | Pomeranz | 372/20 |
| 2011/0206069 A1 | 8/2011 | Bowman et al. | |

OTHER PUBLICATIONS

A. Diening, P. E.-A. Möbert, and G. Huber, "Diode-pumped continuous-wave, quasi-continuous-wave, and Q-switched laser operation of Yb3+, Tm3+: YLiF4 at 1.5 and 2.3 μm," J. Appl. Phys. 84, 5900 (1998).

A. M. Malyarevich et al., "V:YAG—a new passive Q-switch for diode-pumped solid-state lasers", Appl. Phys. B 67, 555 (1998).

E. Mejia, L. A. Zenteno, P. Gavrilovic, and A. Goyal, "High-efficiency lasing at 810 nm in single-mode Tm3+ doped fluorozirconate fiber pumped at 778 nm," Opt. Eng. 37, 2699 (1998).

F. Heine et al., "CW YB,Tm:LiYF, Upconversion Laser at 650 nm, 800 nm, and 1500 nm," OSA Proceedings on Advanced Solid-State LaFcrs, 1995, vol. 24. Bruce H. Z Chai and Stephen A. Payne (eds.).

H. Friedman et al., "Scaling of solid state lasers for satellite power beaming applications," SPIE vol. 2121: Laser Power Beaming, pp. 49-57 (1994).

J. N. Carter, R. G. Smart, D. C. Hanna, and A. C. Tropper, "Lasing and amplification in the 0.8 μm region in thulium doped fluorozirconate fibres," Electron. Lett. 26, 1759 (1990).

J. Y. Allain, M. Monerie, and H. Poignant, "Tunable cw laser around 0.82, 1.48, 1.88, and 2.35 μm in thulium-doped fluorozirconate fibre," Electron. Lett. 25, 1660 (1989).

M. E. Storm et al., "Thulium YAG laser operation at 2.1 μm," Applied Optics, vol. 28, No. 3, pp. 408-409 (Feb. 1, 1989).

R. G. Smart, A. C. Tropper, D. C. Hanna, J. N. Carter, S. T. Davey, S. F. Carter, and D. Szebesta, "High efficiency, low threshold amplification and lasing at 0.8 mm in monomode Tm3+-doped fluorozirconate fibre," Electron. Lett. 28, 58 (1992).

R. G. Smart, J. N. Carter, A. C. Tropper, and D. C. Hanna, "20 dB gain thulium-doped fluorozirconated fibre amplifier operating at around 0.8 μm," Electron. Lett. 27, 1123 (1991).

Yu. F. Vaksman et al., "Preparation and optical properties of the co-doped ZnTe single crystals," Semiconductors 41, 660 (2007).

Notification of Transmittal of the International Search Report and the Written Opinion of the International Searching Authority for PCT Application No. PCT/US2014/47025 dated Jul. 17, 2014, mailed May 22, 2015, 28 pages.

* cited by examiner

THULIUM LASER

GOVERNMENT SUPPORT

This invention was made with government support under Contract No. FA8721-05-C-0002 awarded by the Defense Advanced Research Projects Agency. The government has certain rights in this invention.

BACKGROUND

Thulium-doped crystals have been used in solid-state lasers, such as Tm:YAG lasers, to generate light at wavelengths of about 1.85 μm to about 2.1 μm for applications including remote sensing (e.g., lidar), dermatology treatments, optical pumping, and other high-power applications. Stimulated emission from thulium at a wavelength of about 820 nm has also been reported in thulium-doped flurozirconate (ZBLAN) glass fibers. Fluorozirconate glass fiber has attractive properties for operation at 820 nm, including long upper-state lifetimes and a guided wave geometry for both the pump light and laser light. On the other hand, fluorozirconate is difficult to handle and fabricate. As a glass, fluorozirconate has low thermal conductivity compared with typical crystals used as laser hosts, and therefore does not scale to high power laser operation.

SUMMARY

Embodiments of the present invention include a laser with a gain medium comprising crystalline material (e.g., a polycrystalline material) doped with thulium and a method of generating light from a gain medium comprising crystalline material doped with thulium, which has a $^3H_4$ manifold, a $^3H_6$ manifold, and a $^3F_4$ manifold. In operation, a pump source, such as a flash lamp or diode laser, pumps the gain medium with a pump beam at a pump wavelength of less than about 820 nm so as to stimulate emission of light from the thulium at an output wavelength of about 800 nm to about 850 nm via a laser transition in the thulium from the $^3H_4$ manifold to the $^3H_6$ manifold. In addition, either the gain medium, the pump source, or both the gain medium and the pump source limits a population of the thulium in the $^3F_4$ manifold to a predetermined level so as to mitigate accumulation of the thulium in the $^3F_4$ manifold via relaxation of the thulium from the $^3H_4$ manifold.

Suitable crystalline materials include, but are not limited to YAG, YAlO$_3$, GdVO$_4$, YVO$_4$, YLF, Y$_2$O$_3$, LaF$_3$, BaY$_2$F$_8$, Y$_2$SiO$_5$, KY(WO$_4$)$_2$, LaF$_3$, YCa$_4$O(BO$_3$)$_3$, LiNbO$_3$, and isomorphs thereof. The crystalline material may be doped with thulium at a concentration of about $1 \times 10^{18}$ cm$^{-3}$ to about $3 \times 10^{20}$ cm$^{-3}$ so as to reduce the thulium cross-relaxation rate from the $^3H_4$ and $^3H_6$ manifolds to the $^3F_4$ manifold. In addition, the crystalline material may be selected to have a phonon cut-off energy of less than about 700 cm$^{-1}$ so as to reduce the thulium non-radiative relaxation rate from the $^3H_4$ manifold to the $^3F_4$ manifold. For instance, the crystalline material may comprise chromium-doped YAG or chromium-doped YAlO$_3$ to absorb at least a portion of the pulsed electromagnetic energy and to transfer at least a portion of the absorbed energy to the thulium.

The pump beam may be a continuous-wave beam or a pulsed beam with a pump wavelength of about 770 nm to about 810 nm. In either case, the pump beam may be coupled into a waveguide that is defined in or by the gain medium and that contains at least a portion of the thulium. If the pump beam is a pulsed beam, the pulse duration may have a duration of less than a lifetime of the $^3F_4$ manifold so as to mitigate population accumulation in the $^3F_4$ manifold. In addition, the period between pulses in a pulsed pump beam may be set to be greater than the lifetime of the $^3F_4$ manifold. If desired, the pulse energy of a pulsed pump beam may be about 1 μJ per pulse to about 1 kJ per pulse.

In some examples, the crystalline material in the gain medium is doped with at least one co-dopant, which, in operation, receives energy transferred from thulium in the $^3F_4$ manifold so as to cause the thulium in the $^3F_4$ manifold to transition from the $^3F_4$ manifold to the $^3H_6$ manifold. Suitable co-dopants include, but are not limited to holmium, terbium, europium, samarium, and praseodymium.

In other examples, the crystalline material is doped with a co-dopant, such as ytterbium, that transfers energy to the thulium in the $^3F_4$ manifold so as to excite the thulium in the $^3F_4$ manifold to the $^3H_4$ manifold. In these examples, the laser may include another pump source, in optical communication with the crystalline material, to pump the co-dopant so as to cause the energy transfer.

Another example of a thulium laser may be configured to stimulate emission of light from the gain medium at a wavelength of about 2 microns so as to reduce the population of thulium in the $^3F_4$ manifold. Stimulated emission at about 2 microns may occur through amplification of 2-micron radiation generated by an external source or via spontaneous emission from the gain medium itself. If desired, the cavity may be configured to resonate at both the output wavelength and at about 2 microns so as to promote de-population of the $^3F_4$ manifold.

Yet another embodiment includes a cooling device, such as a cryogenic cooler, in thermal communication with the gain medium. In operation, the cooling device cools the crystalline material to a temperature of less than about 200 K (e.g., to 150 K, 100 K, 77 K, 50 K, or 25 K) so as to limit the population of the thulium in the $^3F_4$ manifold.

In another example, the thulium laser comprises a translation stage, a beam deflector (e.g., a galvo-scanning mirror or acousto-optic beam deflector), or both to move the pump beam relative to the crystalline material such that the portion of the crystal host populated with thulium trapped in the $^3F_4$ manifold population is translated out of the region where stimulated emission occurs. As the region with a trapped thulium population is moved out of the pump beam's path, another region containing different thulium ions moves into the pump beam's path. The thulium ions in this population have no population in the $^3F_4$ manifold and can therefore be excited by the pump beam for stimulated emission. At the same time, the trapped population in the first region relax back to the ground state as the $^3F_4$ manifold's lifetime elapses.

Certain thulium lasers may include a Q switch that modulates the quality factor of the laser cavity that contains the gain medium so as to produce a pulsed output beam. The Q-switch may comprise at least one optical element doped with vanadium, cobalt, and/or chromium.

Another embodiment includes a laser with a gain medium, a pump source, and a cooling device. The gain medium includes a crystal host with a phonon cut-off energy of equal to or less than about 700 cm$^{-1}$. Thulium is doped into the crystal host at a concentration of about $1 \times 10^{18}$ cm$^{-3}$ to about $3 \times 10^{20}$ cm$^{-3}$. In operation, the pump source, which is in optical communication with the gain medium, pumps the gain medium at a wavelength of about 770 nm to about 810 nm so as to excite the thulium from the $^3H_6$ manifold to the $^3H_4$ manifold, thereby stimulating emission of light at a wavelength of about 800 nm to about 850 nm. And the cooling device, which is in thermal communication with the gain medium, cools the gain medium to a temperature of less than about 200 K so as to limit a population of the thulium in the $^3F_4$ manifold.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Embodiments of the present invention include solid-state lasers that operate using the $^3H_4$ to $^3H_6$ transition in thulium ($Tm^{3+}$) doped into crystalline host materials. A thulium laser that operates at this transition emits a laser beam at a wavelength of about 800 nm to about 850 nm (e.g., 810 nm, 820 nm, 830 nm, or 840 nm), which is useful for applications including, but not limited to power beaming, target illumination, and remote sensing (e.g., lidar and ladar). For example, a laser that emits light at 820 nm can be used to power a satellite, unmanned aerial vehicle, or other remote device equipped with silicon or gallium arsenide (GaAs) photovoltaic cells, which absorb light at 820 nm. Other applications include optical amplification (e.g., for Ti: sapphire lasers), materials processing (e.g., cutting, welding, peening, etc.), active illumination, infrared countermeasures, laser therapy, and spectroscopy.

In addition, doping with thulium introduces a relatively small quantum defect, so a thulium laser can be scaled to high average power with good beam quality. Put differently, the energy difference between the pump and laser photon energies may be transformed into heat, which limits the maximum output power. The difference between the pump and laser photon energies in thulium lasers can be relatively small, which means that thulium lasers can be scaled higher output powers. Lasers based on thulium-doped crystalline material may also be more efficient and operate at higher average powers than other solid-state lasers that emit light in the 800-850 nm wavelength range.

Figure 1:
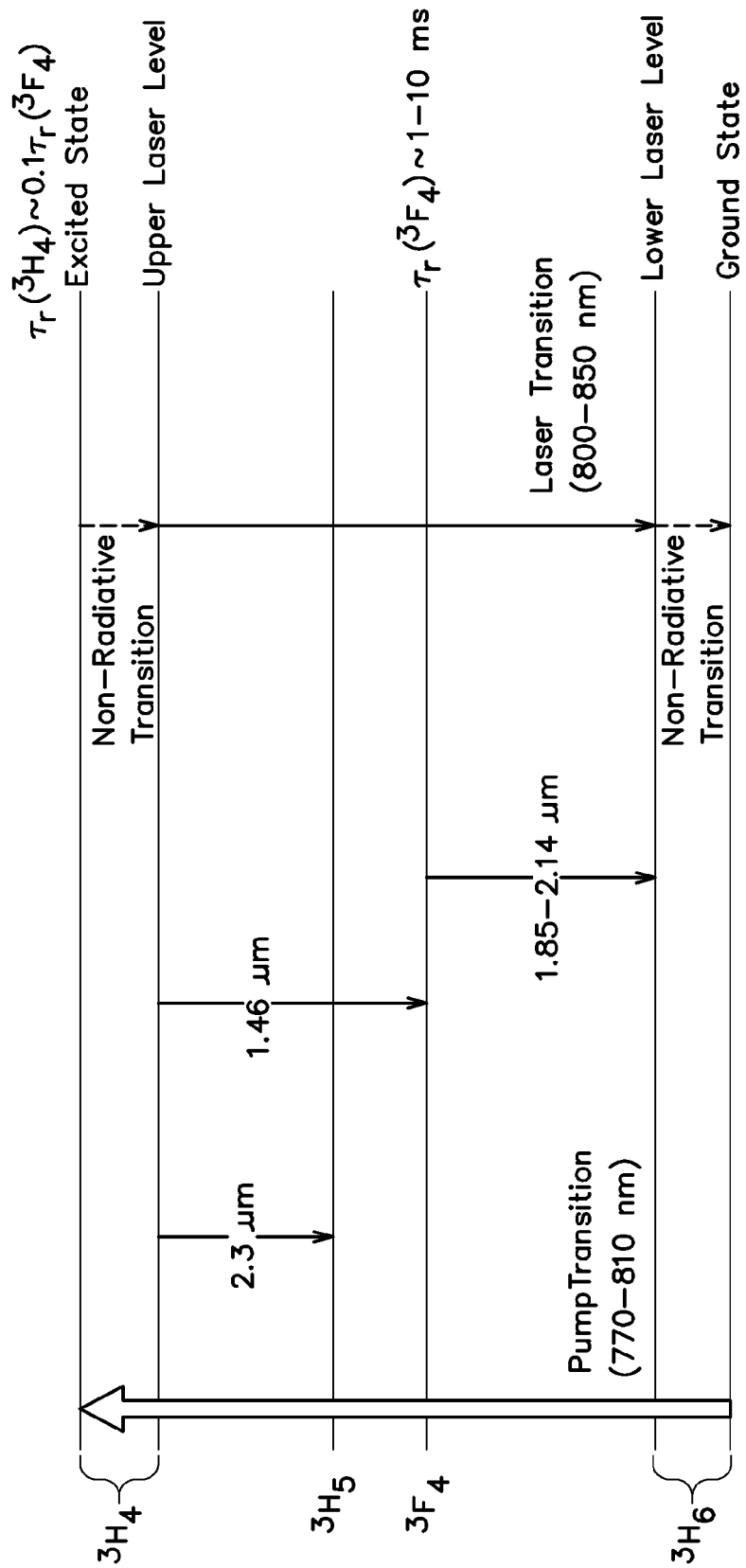
FIG. 1 illustrates energy-level manifolds and various laser transitions in thulium ($Tm^{3+}$), including a laser transition from the $^3H_4$ manifold to the $^3H_6$ manifold at about 820 nm.

FIG. 1 is a partial energy-level diagram for thulium ($Tm^{3+}$) that depicts the $^3H_4$, $^3H_6$, and $^3F_4$ manifolds involved in the lasing transition at about 820 nm. In this context, a manifold is a group of closely spaced energy levels. In a rare-earth ion, which has a 4f-shell outer electron configuration, the energy between manifolds is set by spin-orbit coupling and the energy level positions within a manifold are set by the crystal field (essentially the Stark effect).

FIG. 1 shows lasing on $^3H_4$ to $^3H_6$ transition. First, an optical pump beam at a wavelength of about 780 nm excites a thulium ion via a pump transition from an energy level in the $^3H_6$ manifold to a level in the $^3H_4$ manifold. The thulium ion relaxes non-radiatively to the upper laser level in the $^3H_4$ manifold, then undergoes a lasing transition from the upper laser level to the lower laser level, which is in the $^3H_6$ manifold above the ground state. In undergoing the lasing transition, the thulium ion emits light at a wavelength of about 800 nm to about 850 nm (e.g., about 820 nm) by stimulated emission. The thulium ion then relaxes non-radiatively from the lower laser level in the $^3H_6$ manifold back to the ground state.

Figure 2:
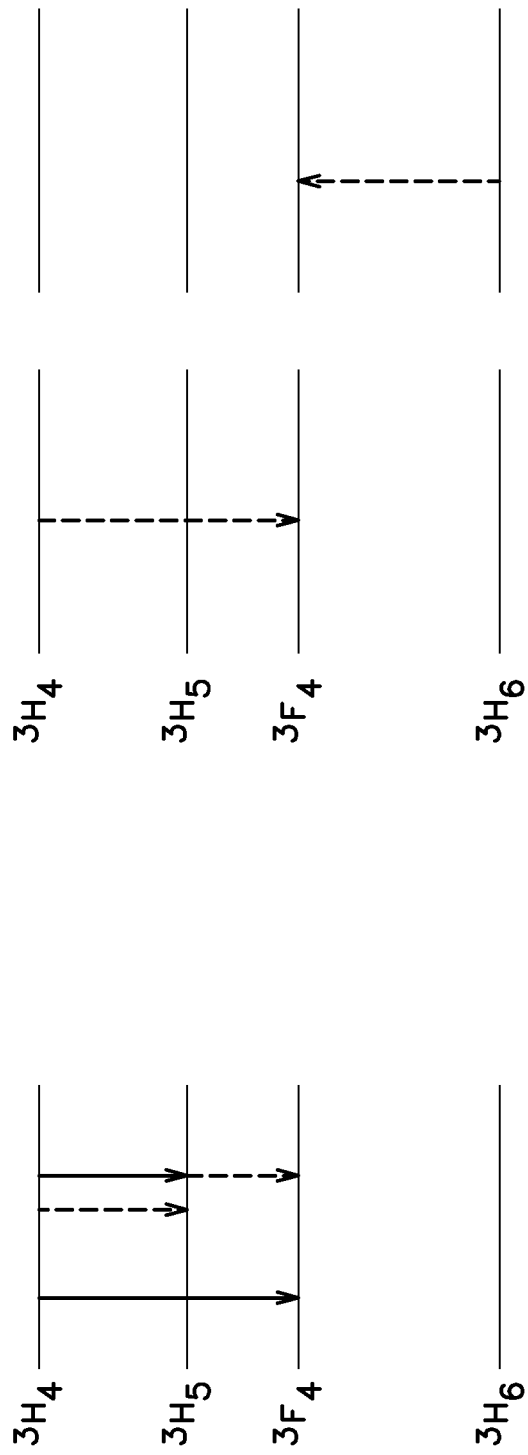
FIG. 2A illustrate radiative paths (solid arrows) and non-radiative paths (dashed arrows) to populate $^3F_4$ manifold.
FIG. 2B illustrates cross relaxation (dotted arrows) between thulium ions from the $^3H_4$ and $^3H_6$ manifolds to the $^3F_4$ manifold.

FIGS. 2A and 2B show that excited thulium also decays radiatively from the $^3H_4$ manifold to a pair of intermediate manifolds: the $^3H_5$ manifold, with an attendant emission at about 2.3 µm, and the $^3F_4$ manifold, with an attendant emission at about 1.46 µm. (Somewhat confusingly, in some conventions, the $^3F_4$ intermediate manifold is labeled as the $^3H_4$ intermediate manifold, and the $^3H_4$ upper manifold is labeled as the $^3F_4$ upper manifold.) FIG. 2A shows that a thulium ion may undergo either a radiative transition (solid line) or a non-radiative transition (dashed line) from the $^3H_4$ excited-state manifold to the $^3H_5$ manifold, then relaxes relatively rapidly to the $^3F_4$ manifold. FIG. 2B illustrates cross-relaxation (indicated by dotted lines) between a thulium ion in the $^3H_4$ excited-state manifold and a thulium ion in the $^3H_6$ ground-state manifold that increases the population of the $^3F_4$ manifold. Cross-relaxation causes both the excited-state thulium ion and the ground-state thulium ion to end up in the $^3F_4$ manifold via an energy transfer from the excited-state ion to the ground-state ion.

Although the $^3F_4$ manifold does not participate in the lasing process, its population may increase via radiative relaxation, non-radiative relaxation, and cross relaxation. Unfortunately, the $^3F_4$ manifold's lifetime is about ten times longer than the lifetime of the upper laser level (e.g., about 1-10 ms at room temperature). Because the $^3F_4$ manifold has such a long lifetime, ions that enter the $^3F_4$ level become trapped there. As the population of the $^3F_4$ manifold builds, the gain medium's absorption efficiency decreases, which in turn decreases the laser's overall efficiency. If a large enough fraction (e.g., 50% or more) of the thulium population ends up in the $^3F_4$ manifold, it can be impossible to obtain a population inversion on the $^3H_4$ to $^3H_6$ transition. Without a population inversion, stimulated emission is not possible. Thus, growth in the $^3F_4$ manifold's population may affect a thulium laser's ability to emit an output beam efficiently.

To see how trapping in the $^3F_4$ manifold affects the laser output, consider a thulium laser operating at room temperature. The lower laser level is just a few hundred wavenumbers above the ground state, so the lower laser level is thermally populated at room temperature. As a result, to obtain a population inversion, a few percent of the thulium ions must be in the $^3H_4$ manifold. But a first-order rate equation shows that, in this example, the steady-state population in the $^3F_4$ manifold can be over 20 times greater than the population in the $^3H_4$ manifold. Thus, if 4% of the total thulium population is in the $^3H_4$ manifold, then over 80% of the thulium population is in the $^3F_4$ manifold, leaving only a small fraction of the population in the $^3H_6$ manifold. Increasing the population of the $^3H_4$ manifold results in a proportional increase in the $^3F_4$ manifold's population, which in turn results in a further reduction of the $^3H_6$ manifold's population. If the $^3H_6$ manifold's population becomes too small, then the laser crystal becomes transparent at the pump wavelength, rendering excitation ineffective.

Limiting the population in the $^3F_4$ manifold enables population inversion without rendering the gain medium transparent at the pump wavelength. If desired, the $^3F_4$ manifold's population can be limited to a given value by mitigating trapping in the $^3F_4$ manifold. Examples of the present thulium lasers may use one or more approaches to mitigate trapping in the $^3F_4$ manifold that might otherwise prevent population inversion (and stimulated emission). These approaches include, but are not limited to:

(1) using a host material with a relatively low phonon energy (e.g., less than about 700 cm$^{-1}$) in combination with a relatively low thulium doping concentration (e.g., about $1\times10^{18}$ cm$^{-3}$ to about $3\times10^{20}$ cm$^{-3}$);
(2) pumping the thulium-doped gain medium with pulses whose durations and temporal separations are based on the lifetime of the $^3F_4$ manifold;
(3) operating the laser at reduced temperature (e.g., a cryogenic temperature, such as 77 K)
(4) stimulating emission from the $^3F_4$ manifold to reduce the population of the $^3F_4$ manifold;
(5) upconversion pumping of thulium out of the $^3F_4$ manifold via a co-dopant;
(6) de-populating the $^3F_4$ manifold via energy transfer to a co-dopant in the crystal host; and
(7) translating the crystalline medium and the pump beam relative to each other to move the trapped population out of the region where stimulated emission occurs.

As will be understood by those of skill in the art, these approaches can be used individually or, where appropriate, together. For instance, low-phonon energy hosts can be pumped with pulsed laser beams and cooled to cryogenic temperatures. Similarly, cooling the gain medium may increase the efficacy of de-population using stimulating emission on the $^3F_4$ to $^3H_6$ transition. It may also be possible to reduce the population of the $^3F_4$ manifold via simulated emission, upconversion, or energy transfer between pulses of a pump beam whose repetition period is based on the $^3F_4$ manifold's lifetime.

Other difficulties associated with lasing via the $^3H_4$ to $^3H_6$ transition are relatively short upper-state lifetime and the fact that the lower laser level is in the ground-state manifold (i.e., this is a three-level laser transition at room temperature). Both the relatively short upper-state lifetime and the use of only three energy levels may increase the laser's threshold. The laser's threshold can be reduced by using high-brightness pump sources, cooling the laser crystal below room temperature, or any other suitable techniques.

Low-Phonon Energy Crystals and Low Doping Levels to Mitigate Trapping

As mentioned above, FIGS. 2A and 2B show that there are three paths for population of the $^3F_4$ manifold to build: radiative relaxation, non-radiative relaxation, and cross relaxation. Radiative relaxation is considered to be a fundamental process, but both non-radiative relaxation and cross relaxation to the $^3F_4$ manifold can be suppressed by selecting the appropriate crystal host and thulium doping concentration, respectively.

Choosing a crystal host with a relatively low phonon cut-off energy (e.g., less than 700 cm$^{-1}$, 600 cm$^{-1}$, or 500 cm$^{-1}$) may lower the non-radiative relaxation rate, which in turns leads to slower population accumulation in the $^3F_4$ manifold, which in turn mitigates trapping. This is because the non-radiative relaxation rate varies with the phonon cut-off energy: the lower the phonon cut-off energy of a crystal, the lower the non-radiative relaxation rate. For example, at a phonon cut-off energy of less than 700 cm$^{-1}$, the nonradiative relaxation rate from the $^3H_4$ upper laser level may be a small fraction (e.g., about 10%) of the radiative relaxation rate for most crystals; whereas for a phonon cut-off energy 900 cm$^{-1}$, nonradiative rates may be significant when compared with the radiative rates. In some cases, the nonradiative relaxation rates may be about the same as the radiative relaxation rates.

Similarly, choosing a lower thulium doping concentration rate may reduce the cross-relaxation rate, which generally increases as the thulium doping concentration increases. For doping levels of less than about $8\times10^{19}$ cm$^{-3}$, in most crystals, the cross-relaxation rate becomes a small fraction (e.g., about 10%) of the radiative transition rate. This reduction in the cross-relaxation rate leads to slower accumulation of thulium in the $^3F_4$ manifold, which in turn mitigates trapping.

Pulsed Pumping to Mitigate Trapping

Figure 3:
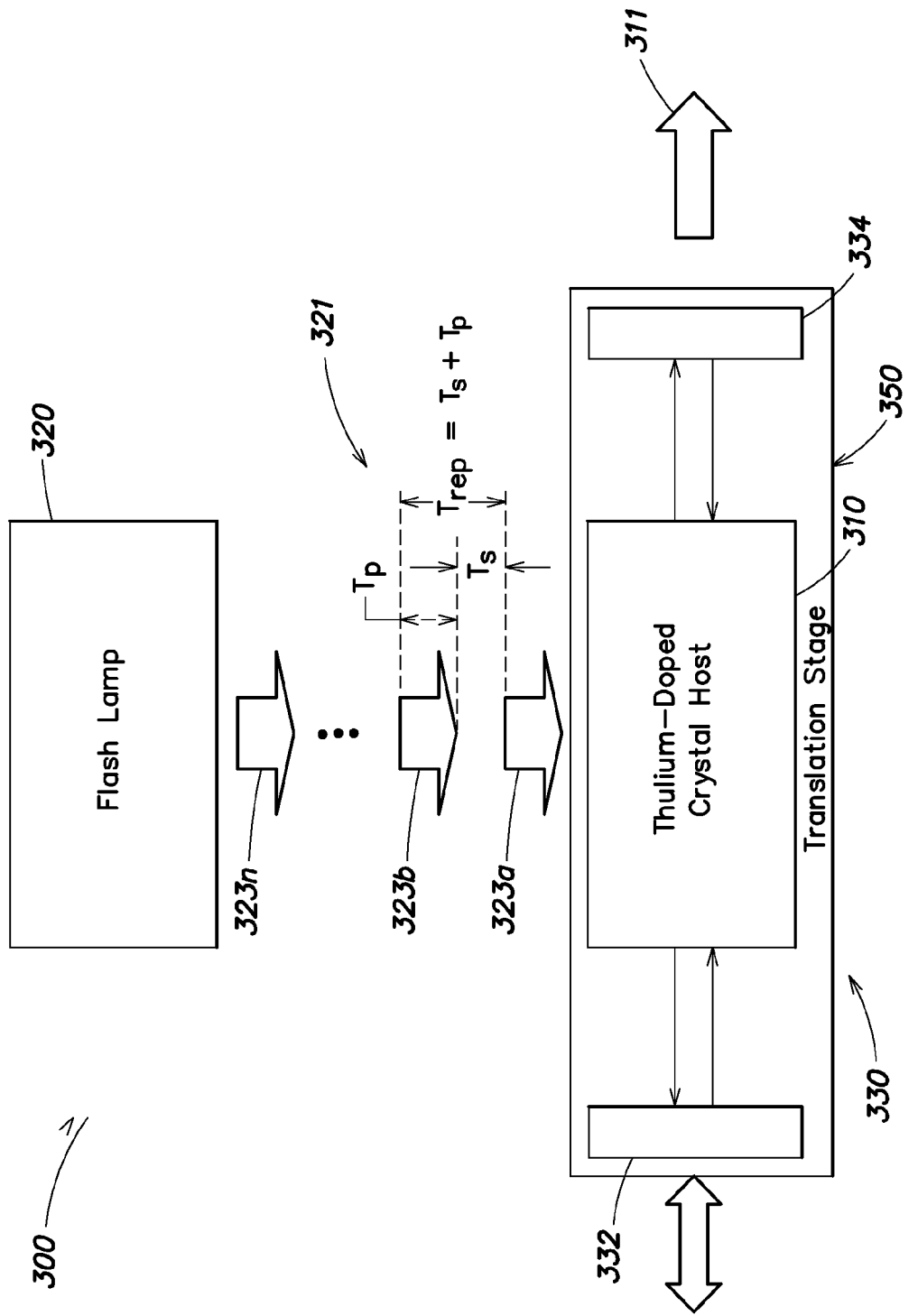
FIG. 3 is a block diagram of a flash lamp-pumped thulium ($Tm^{3+}$) laser that emits coherent radiation at a wavelength of about 800 nm to about 850 nm (e.g., at about 820 nm) according to principles of the present invention.

FIG. 3 is a block diagram of an exemplary thulium laser 300 that employs pulsed pumping to mitigate population accumulation in the $^3F_4$ manifold. The thulium laser 300 includes a gain medium, shown here as a thulium-doped crystal host 310, such as yttrium aluminum garnet (YAG; $Y_3Al_5O_{12}$), YAlO$_3$, GdVO$_4$, YVO$_4$, LiYF$_4$ (YLF), KY(WO$_4$)$_2$, BaY$_2$F$_8$, LaF$_3$, YCa$_4$O(BO$_3$)$_3$, LiNbO$_3$ and their isomorphs. A suitable host may be formed from a single crystal or a polycrystalline ceramic, such as YAG and Y$_2$O$_3$, with a size ranging from millimeters by millimeters to centimeters by centimeters. Compared to other host materials, such as ZBLAN glass fibers, crystalline host materials are less brittle, easier to handle, and easier to fabricate. They have high thermal conductivities (e.g., 11 W/mK for YAG versus 0.63 W/mK for ZBLAN), which enables better power scaling. Crystalline host materials may also have lower phonon energies, which can be used to mitigate trapping of the thulium in energy levels that do not participate in the lasing transition as explained in greater detail below.

The thulium-doped crystal host 310 is doped with thulium at a concentration of about $1\times10^{18}$ cm$^{-3}$ to $3\times10^{20}$ cm$^{-3}$. If desired, the thulium concentration may be relatively low (e.g., less than about $8\times10^{19}$ cm$^{-3}$) to reduce the cross-relaxation rate as explained above. In some cases, the crystal host may also be doped with one or more co-dopants, such as chromium (Cr$^{3+}$) or terbium (Tb$^{3+}$), to facilitate trapping mitigation and/or energy transfer as discussed below.

The thulium-doped crystal host 310 sits within a cavity 330 defined by a reflector 332 and a partially reflecting output coupler 334. The crystal host 310, reflector 332, and output coupler 334 can be mounted on a translation stage 350, which may move in the directions indicated by the double-headed arrow in FIG. 3. The reflector 332 may be a dielectric mirror with a relatively high reflectivity (e.g., 99% or greater) at the wavelength of the output beam 311. The output coupler 334 may be another dielectric mirror whose reflectivity at the output beam wavelength is lower (e.g., 99% or less) than that of the reflector 332. Although FIG. 3 shows the reflector 332 and output coupler 334 as discrete components, they can also be formed directly on the ends of the thulium-doped crystal host 310 as dielectric coatings.

The laser 300 also includes a pump source, such as a diode laser or, in this case, a flash lamp 320, that pumps the gain medium 310 with a pump beam 321. The pump beam can be narrowband or broadband, so long as its spectrum extends at least partially to wavelengths shorter than about 820 nm, which corresponds to pump photon energies greater than or equal to the energy of the transition from the $^3H_6$ ground state to the $^3H_4$ excited state. The pump beam 321 may propagate along the gain medium's longitudinal axis or illuminate the gain medium 310 on one or more sides as shown in FIG. 3. The laser 300 may also include one or more optional mirrors (not shown) to direct light from the flash lamp 320 onto the gain medium's exposed surfaces. For instance, the gain medium 310 and flash lamp 320 may be disposed at the foci of an elliptical mirror, which reflects portions of pump beam 321 propagating away from the gain medium 310 back towards the gain medium 310.

In operation, the thulium laser 300 shown in FIG. 3 uses pulsed pumping to mitigate the deleterious effects of thulium trapping in the $^3F_4$ manifold. The flash lamp 320 generates a pulsed pump beam 321 that includes pulses 323a, 323b, ..., 323n (collectively, pulses 323), each of which may have a pulse energy of about 1 µJ to about 1 kJ. The pulsed beam 321 has a nominal pulse repetition period $\tau_{rep}$, which corresponds to a pulse spacing $\tau_s$ for a given pulse duration $\tau_p$. The pulse repetition period $\tau_{rep}$, pulse spacing $\tau_s$, and pulse duration $\tau_p$ may be selected based on the lifetime of the $^3F_4$ manifold to limit the $^3F_4$ manifold's population. For instance, the pulse repetition period $\tau_{rep}$ and pulse spacing $\tau_s$ may be equal to or longer than the $^3F_4$ manifold's lifetime, and the pulse duration $\tau_p$ may be shorter than the $^3F_4$ manifold's lifetime. Depending on the application, the pulse repetition period $\tau_{rep}$, pulse spacing $\tau_s$, and pulse duration $\tau_p$ may be fixed (e.g., the pulses 323 may be spaced periodically) or variable; for instance, the pulse duration and pulse spacing may be adjusted on a pulse-to-pulse basis.

The pulses 323 excite the thulium-doped crystal host 310, which may be co-doped with chromium ($Cr^{3+}$), at a relatively low pulse repetition frequency (e.g., up to tens of Hertz). In some embodiments, the broadband light from the flash lamp may be absorbed primarily by the chromium co-dopant. The chromium subsequently transfers the absorbed energy to the thulium, which is excited along the pump transition shown in FIG. 1. Chromium-based transfer may be particularly suitable for crystal hosts composed of $Al^{3+}$ or $Ga^{3+}$ since $Cr^{3+}$ can be easily substituted for either of $Al^{3+}$ or $Ga^{3+}$; examples of appropriate hosts include YAG and $YAlO_3$.

Before the flash lamp 320 emits the first pump pulse 323a, there is little to no population in the $^3F_4$ manifold; except for thermal excitation, the thulium population is largely in the ground state. As the thulium-doped crystal host 310 absorbs the first pump pulses 323a, at least a portion of the thulium population transitions to the $^3H_4$ manifold, which in turn causes the population of the $^3F_4$ manifold to build over the course of the pump pulse 323a. If the pump pulse 323a lasts a relatively long time (e.g., two or more $^3F_4$ lifetimes), then the $^3F_4$ manifold's population may reach its steady-state value before the end of the pump pulse 323a. Once the $^3F_4$ manifold's population reaches steady state, the gain medium 300 may no longer be able to sustain the population inversion necessary for lasing.

To prevent the $^3F_4$ manifold's population from reaching steady state, the flash lamp 320 may emit pulses 323 that are shorter than the $^3F_4$ lifetime. For example, each pulse 323 may last only a fraction of the $^3F_4$ lifetime. At room temperature, the pulse durations may be anywhere from picoseconds to hundreds of nanoseconds or possibly even a few milliseconds (e.g., 10 ns, 100 ns, 250 ns, 500 ns, 1 ms, 2.5 ms, or 5 ms), depending on the thulium doping concentration, crystal host material, laser operating temperature, and co-dopants (if any). If desired, the pulse duration may be adjusted during operation or between pulses, e.g., on a pulse-to-pulse basis, to limit the $^3F_4$ manifold's population to a level below the steady-state value.

In addition, the pulse period, duty cycle, and period between successive pulses may also be adjusted to limit the $^3F_4$ manifold's population to a desired (predetermined) level. As understood by those of skill in the art, once a given pump pulse 323 is over, the population of the $^3F_4$ manifold begins to relax back to the ground state. If the period between pulses 323 is relatively short (e.g., shorter than the $^3F_4$ lifetime), then the population of the $^3F_4$ manifold may not relax completely back to the ground state. As a result, the population of the $^3F_4$ manifold may reach its steady-state value sooner after the start of the next pulse. But if the period between pulses 323 is long enough (e.g., longer than the $^3F_4$ lifetime), then the population of the $^3F_4$ manifold may relax mostly back to the ground state between successive pulses 323. By allowing the $^3F_4$ manifold's population to relax increases the time it takes to reach steady state after the start of the next pulse 323, which in turn makes it possible to use longer pulses 323 while still limiting the $^3F_4$ manifold's population to a given level.

Translation to Mitigate Trapping

Another approach to mitigating trapping is to translate the crystalline medium 310 and pump beam 321 relative to each to other to move trapped $Tm^{3+}$ ions out of the region where stimulated emission is occurring and move different $Tm^{3+}$ ions with no population in $^3F_4$ into the pump beam to generate stimulated emission. To mitigate trapping by moving the pump beam 321, the residence time of a $Tm^{3+}$ ion in the pump beam 321 should be on the order of the $^3F_4$ lifetime or less. A trapped $Tm^{3+}$ ion should be allowed to relax significantly (e.g., for a time on the order of a $^3F_4$ lifetime or more) before being translated back into the pump beam 321.

If the pump beam 321 illuminates only a portion of the crystal host (e.g., a spot near the area representing pulse 323a), this can be accomplished by moving the thulium-doped crystal host 310 back and forth using the translation stage 350. It can also be accomplished by scanning the pump beam 321 with respect to the crystal host 310, e.g., with a mirror mounted on a galvo scanner, an acousto-optic beam deflector (for coherent pump beams 321), or with any other suitable arrangement. Alternatively, the crystalline medium (crystal host 310) can be made in the form of a circular disk and rotated about the disk's axis. The pump beam diameter can be a small fraction of the disk radius and be incident on the disk near the disk's periphery to provide conditions to mitigate trapping.

Active Trapping Mitigation

Figure 4:
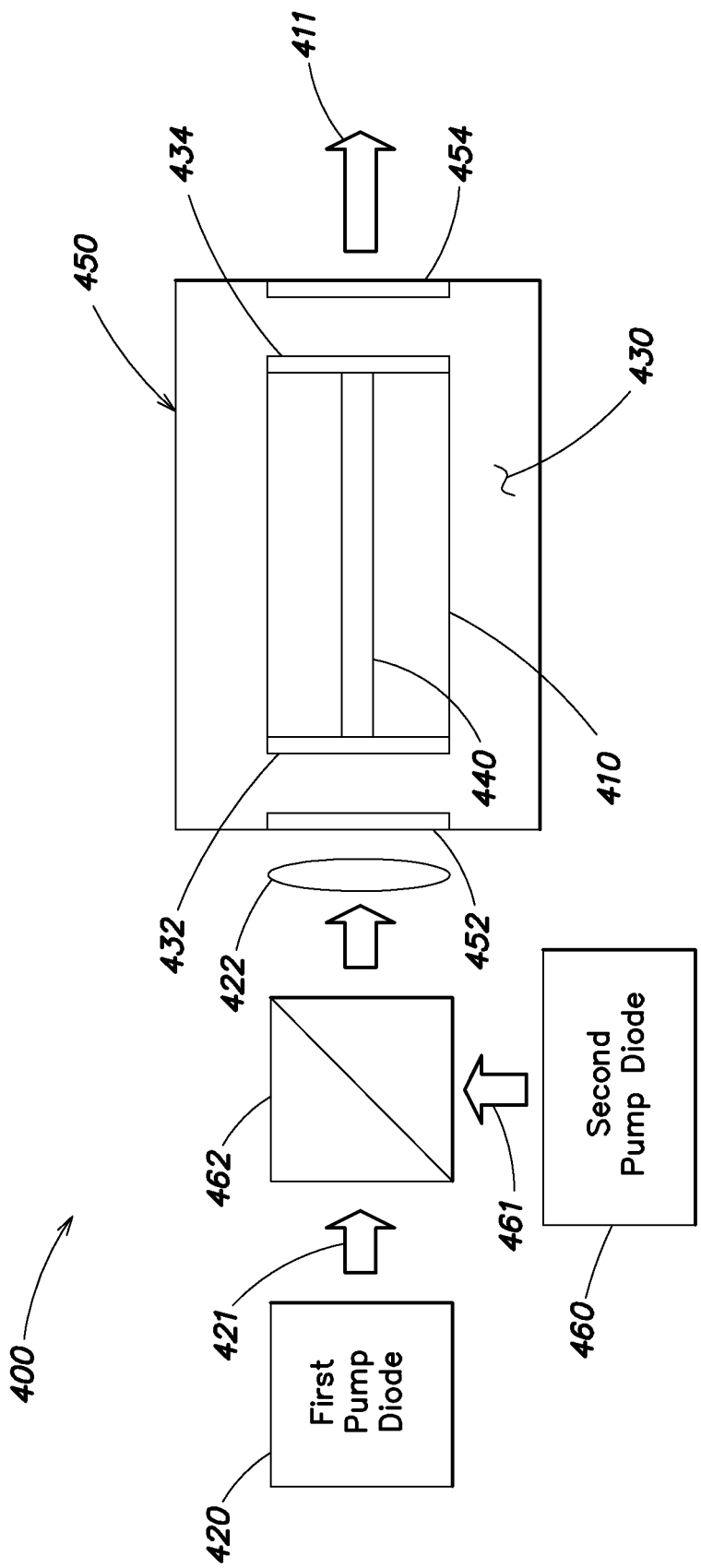
FIG. 4 is a block diagram of a diode-pumped, cryogenically cooled thulium ($Tm^{3+}$) laser with a waveguide and an upconversion diode pump according to principles of the present invention.

FIG. 4 shows another thulium laser 400 that operates on the $^3H_4$ to $^3H_6$ lasing transition and uses cryogenic cooling and either stimulated emission from the $^3F_4$ manifold to the ground state or up-conversion pumping to mitigate trapping in $^3F_4$ manifold. Like the thulium laser 300 shown in FIG. 3, the thulium laser 400 in FIG. 4 includes a thulium-doped crystal host 410 disposed within a cavity 430 formed by reflective coatings 432 and 434 on opposite ends of the thulium-doped crystal host 410. A pump source, shown here as a first pump diode 420, emits a first pump beam 421 that is coupled into the cavity 430 via the first coating 432, which transmits light at the pump wavelength (about 770 nm to about 810 nm) and reflects light at the output wavelength (about 800 nm to about 850 nm). In operation, the pump beam 421 excites the thulium-doped crystal host 420 enabling stimulated emission of light at the output wavelength. The second partially reflective coating 434 transmits a portion of the emitted light out of the cavity 430 as an output beam 411.

In this case, one or more lenses 422 couples the pump beam 421 into a waveguide 422 in the gain medium 410. The lens 422 may be selected to match the pump beam's spatial profile to the mode(s) guided by the waveguide 440. The waveguide 440, which may be formed by ion implantation, liquid phase epitaxy, adhesive-free bonding, crystalline fibers, or any other suitable technique, confines the pump beam 421, increasing the absorption efficiency within the waveguide 440.

Cooling to Mitigate Trapping

Reducing the laser's operating temperature below room temperature mitigates the deleterious effects of population accumulation in the $^3F_4$ manifold. As readily understood by those of skill in the art, thermal excitation may cause a portion of the thulium population to occupy the lower laser level in the $^3H_6$ manifold, which increases the pump rate necessary to achieve population inversion. Cooling the gain medium 410 reduces the portion of the thulium population in the lower laser level at thermal equilibrium, which in turn reduces the population needed in the $^3H_4$ manifold to achieve a population inversion on the $^3H_4$ to $^3H_6$ transition. The population trapped in the $^3F_4$ manifold increases in tandem with the $^3H_4$ manifold's population, so reducing the population required to achieve inversion reduces the size of the population trapped in the $^3F_4$ manifold.

In the example shown in FIG. 4, the laser 400 includes a cooling device, such as a cryogenic cooler 450, that contains the gain medium 410. The cryogenic cooler 450 cools the gain medium 410 below a temperature of about 200 K (e.g., to about 150 K, 100 K, 77 K, or even down to 20 K or below) so as to reduce the excited-state manifold population necessary for achieving population inversion, which mitigates trapping as discussed above. The cryogenic cooler 450 includes an input window 452 to admit the pump beam 421 and an output window 454 for the output beam 411.

Stimulated Emission to Mitigate Trapping

The laser 400 shown in FIG. 4 may also employ stimulated emission on the $^3F_4$ to $^3H_6$ transition to de-populate the $^3F_4$ manifold. The cavity 430 may be designed and built to resonate at both the output wavelength of about 820 nm and at a wavelength of about 1.85-2.14 μm, which is the emission wavelength associated with the $^3F_4$ to $^3H_6$ transition. In this case, if the thulium doping concentration is high enough (e.g., about 2% to about 20%), a cross-relaxation process leads to efficient population of the $^3F_4$ manifold. As described above, cross relaxtion involves an energy exchange between a $Tm^{3+}$ ion in the $^3H_4$ manifold and a $Tm^{3+}$ ion in the $^3H_6$ ground state manifold. This energy exchange results in the two $Tm^{3+}$ ions moving to the $^3F_4$ manifold. Lasing or photon emission from the laser crystal 15 then occurs at a wavelength around 2 microns as the $Tm^3$ ions in the $^3F_4$ manifold transition to the $^3H_6$ lower manifold because of stimulated emission at a wavelength of about 2 microns. Each transition further de-populates the $^3F_4$ manifold, thereby ameliorating the effects of trapping in the $^3F_4$ manifold. For more information on stimulated emission via cross-relaxation, see, e.g., U.S. Pat. No. 4,969,150 to Esterowitz et al., which is incorporated herein by reference in its entirety.

Alternatively, the gain medium 410 may be doped with a co-dopant, such as chromium ($Cr^3$), that transfers energy to the $^3F_3$ and $^3H_4$ manifolds of the $Tm^{3+}$ ions by way of dipole-dipole interactions. Nonradiative decay of the $^3F_3$ manifold places virtually all of the excited $Tm^{3+}$ ions in the $^3H_4$ manifold. Each excited $Tm^{3+}$ ion then interacts with a ground-state $Tm^{3+}$ in a cross-relaxation process which gives rise to two $Tm^{3+}$ ions in the $^3F_4$ manifold, which acts the upper laser level for the 2-micron stimulated emission. Lasing or photon emission then occurs at about 2.014 microns as the excited $Tm^{3+}$ ions in the $^3F_4$ upper manifold decay to the $^3H_6$ lower manifold. For more information on stimulating emission from the $^3F_4$ manifold using a co-dopant, see, e.g., U.S. Pat. No. 4,969,154 to Esterowitz et al., which is incorporated herein by reference in its entirety.

Simulated emission at about 2 microns may also be induced by amplifying radiation at a wavelength of about 2 microns in the pumped region of the crystal host. The stimulated emission that causes amplification of the 2-micron beam de-populates the $^3F_4$ manifold. In some cases, the source of the 2-micron radiation may be spontaneous emission from the thulium-doped crystalline medium itself. This is known as amplified spontaneous emission, and may occur in a gain medium that includes a waveguide (e.g., waveguide 440 in FIG. 4). Alternatively, the 2-micron radiation may be supplied by an external source, such as a diode laser. The laser cavity may also be configured to resonate at both the output wavelength (e.g., with a range of 800-850 nm) and at about 2 microns to promote de-population of the $^3F_4$ manifold via stimulated emission at 2 microns.

Upconversion Pumping to Mitigate Trapping

Figure 5A:
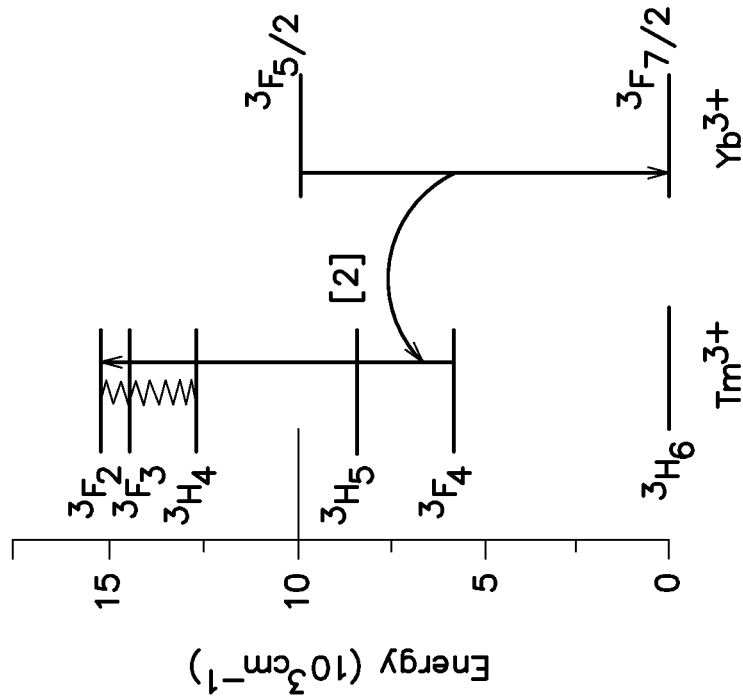
FIGS. 5A and 5B illustrate the first step and second step, respectively, of two-step up-conversion pumping of thulium's $^3H_4$ manifold using ytterbium co-doping to mitigate trapping in the $^3F_4$ manifold according to principles of the present invention.
Figure 5B:
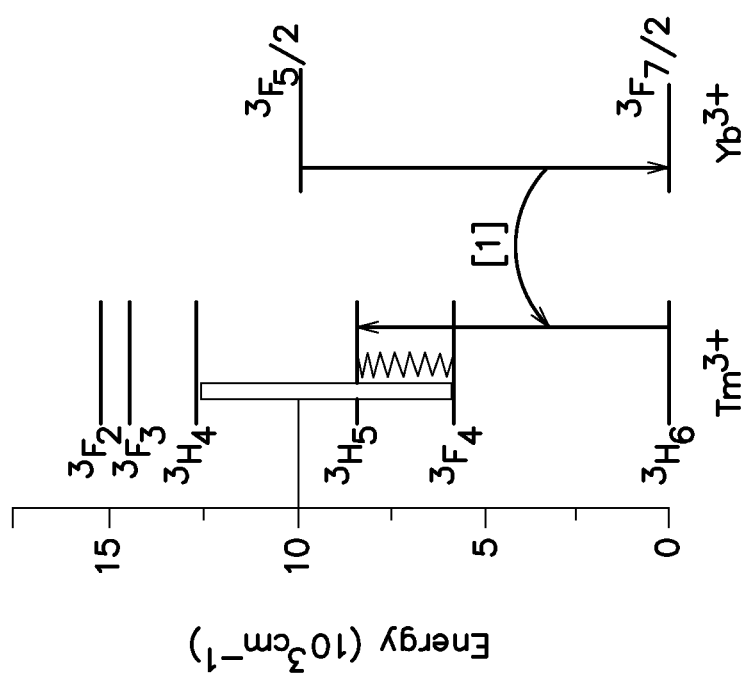

Alternatively, the second pump diode 460 may de-populate the $^3F_4$ manifold via upconversion pumping instead of stimulated emission. As shown in FIGS. 5A and 5B, upconversion pumping may be implemented as a two-step process: first, a co-dopant ion, such as a $Yb^{3+}$ ion, is excited by a first pump photon and transfers its energy to a $Tm^{3+}$ ion, resulting in an excited $Tm^{3+}$ ion in the $^3F_4$ manifold. In the second step, another co-dopant ion absorbs second pump photon and transfers its energy to the excited $Tm^{3+}$ ion in the $^3F_4$ manifold. This second energy transfer excites the $Tm^{3+}$ ion to the $^3H_4$ manifold, de-populating the $^3F_4$ manifold.

FIGS. 5A and 5B illustrate an exemplary upconversion process using ytterbium ($Yb^{3+}$) as the co-dopant. When implemented using the laser shown in FIG. 4, the second pump diode 460 emits the second pump beam 461 at a wavelength of about 975 nm. In the first step, shown in FIG. 5A, a $Yb^{3+}$ ion in the $^2F_{7/2}$ manifold is excited to the $^2F_{5/2}$ manifold by absorption of pump light. Energy is transferred from an excited $Yb^{3+}$ ion to a $Tm^{3+}$ ion, which are excited to the relatively short-lived $^3H_5$ manifold. In a second step, shown in FIG. 5B, another excited $Yb^{3+}$ ion transfers energy to the same $Tm^{3+}$ ion, which is excited from the $^3F_4$ manifold to the upper laser level in the $^3H_4$ manifold. The excitation of the $Tm^{3+}$ ion reduces the population of the $^3F_4$ manifold and may lead to stimulated emission of another photon at the laser's output wavelength.

Energy Transfer to a Co-Dopant

Another approach to mitigating trapping is de-populating the $^3F_4$ manifold via energy transfer to a co-dopant, which may be doped into the crystal host at a concentration of about 0.1% to about 10%. In these types of energy transfer, a $Tm^{3+}$ ion in the $^3F_4$ manifold transfers its energy to a co-dopant ion and thereby returns to the $^3H_6$ ground-state manifold. Examples of co-dopant ions suitable for this energy transfer include, but are not limited to, $Ho^{3+}$, $Tb^{3+}$, $Eu^{3+}$, $Sm^{3+}$, and $Pr^{3+}$.

Q-Switching and Mode-Locking

Thulium-doped crystalline materials can also be operated and used in ways similar to $Yb^{3+}$ lasers. For instance, the output from a thulium-doped crystal host can be Q-switched or mode-locked to generate a pulsed output. Mode locking can be implemented using standard active or passive techniques. In active mode-locking, an acousto-optic modulator can be used to modulate the cavity at a frequency corresponding to a multiple of the inverse of the cavity round-trip time. Passive mode locking can use Kerr-lens mode locking, semiconductor saturable absorber mirrors, graphene saturable absorbers, or any other suitable approach. Similarly, thulium-doped crystal hosts can be formed into thin disks or slabs, used to form waveguides for guiding the pumping and oscillator beams, and/or cryogenically cooled to increase the maximum output power.

Figure 6:
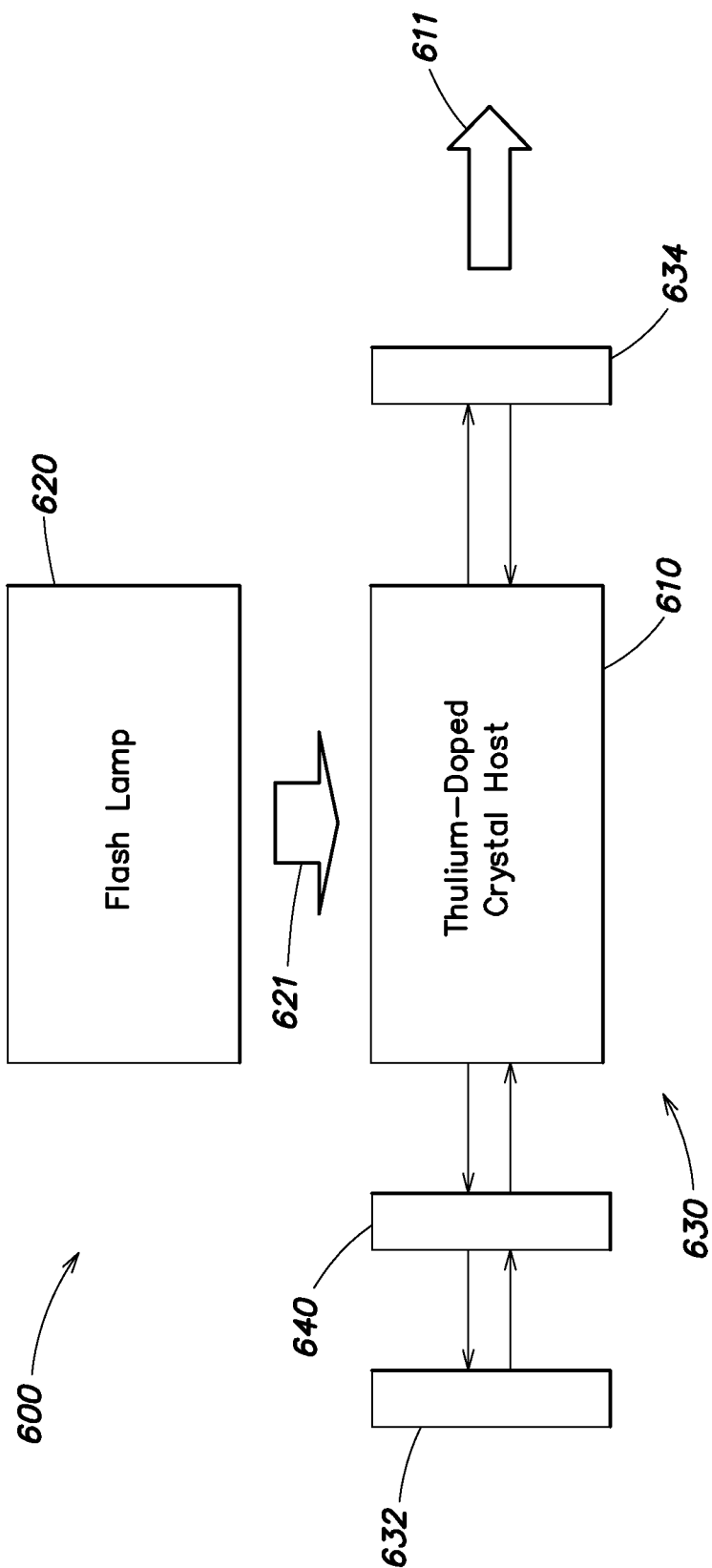
FIG. 6 is a block diagram of a Q-switched thulium ($Tm^{3+}$) laser according to principles of the present invention.

FIG. 6 shows a Q-switched thulium laser 600 that emits an output beam 611 at a wavelength of about 800 nm to about 850 nm (e.g., 820 nm). Like the lasers described above, the Q-switched thulium laser 600 includes a gain medium 610, which can be formed from a single crystal or a polycrystalline ceramic host doped with thulium at a concentration of about $5 \times 10^{20}$ $cm^{-3}$ or less. The thulium-doped crystal host 610 is disposed within a resonant cavity 630 defined by a high reflector 632 on one end and a partially reflecting output coupler 634 on the other end. A flash lamp 620 pumps the thulium-doped crystal host 610 from the side with a broadband pump beam 621, which stimulates emission via the $^3H_4$ to $^3H_6$ transition explained above.

The Q-switched thulium laser 600 also includes a Q-switch 640 disposed in the cavity 630 between the gain medium 610 and the reflector 632 (or between the gain medium 610 and the output coupler 634). As understood by those of skill in the art, the Q-switch 640 modulates the cavity's quality factor, which is a measure of the sharpness or selectivity of the cavity resonance. The Q-switch may be an active device, such as a shutter, Pockels cell, Kerr cell, electro-optic modulator, or acousto-optic modulator, that is actuated by an external source (not shown) and attenuates light when closed and transmits light when opened. Alternatively, the Q-switch may be a passive device, such as a saturable absorber, that absorbs incident light up to a bleaching threshold, at which point it becomes transparent for a brief period before beginning to absorb again. Generally speaking, a saturable absorber should have an absorption cross section that, when multiplied by the laser intensity at the saturable absorber, yields a product that is larger than the product of the laser intensity at the gain medium and the gain medium's stimulated emission cross section. For relatively constant laser intensity, the saturable absorber's absorption cross section should be larger than the gain medium's stimulated emission cross section.

Passive Q-switches for thulium-doped lasers may be made of vanadium ($V^{3+}$), cobalt ($Co^{2+}$), or chromium ($Cr^{4+}$) doped into tetrahedral (or distorted tetrahedral) sites in suitable crystals, such as YAG and ZnTe. For example, V-doped YAG has been used to passively Q-switch $Nd^{3+}$-doped lasers operating near 1.34 µm. Vanadium's absorption cross section near 0.8 µm (the thulium laser wavelength) is even larger than its absorption cross section at 1.34 microns, which indicates vanadium's suitability for use as a Q-switch material in a thulium laser that operates at 820 nm. $Co^{2+}$-doped ZnTe also absorbs strongly in the 820 nm wavelength range and may have a higher absorption cross section that is larger than the stimulated emission cross section of the $^3H_4$ to $^3H_6$ laser transition in thulium. $Cr^{4+}$-doped $Y_2SiO_5$ can be used as a passive Q-switch around 820 nm.

Optical Amplification with Thulium-Doped Crystals

Thulium-doped crystalline materials can also be used for optical amplification. In one example, a thulium-based optical amplifier includes a thulium-doped crystal host (gain medium) that is optically pumped by a light source, such as a flash lamp or diode laser, as explained above with respect to FIGS. 3 and 4. Unlike the lasers shown in FIGS. 3 and 4, the thulium-doped crystal host is not disposed within a resonant cavity. Instead, a signal beam at a wavelength of about 800 nm to about 850 nm enters the gain medium from one end and undergoes optical amplification via stimulated emission of the thulium excited by the pump beam. The amplified signal beam exits the other end of the gain medium. (In some cases, the signal beam may make multiple passes through the gain medium, but does not necessarily resonate within the gain medium.) If desired, a waveguide doped into the gain medium may guide and confine the signal beam for higher efficiency as described with respect to FIG. 6.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the coupling structures and diffractive optical elements disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially o" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B")

can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of generating light from a gain medium comprising crystalline material doped with thulium, the thulium having a $^3H_4$ manifold, a $^3H_6$ manifold, and a $^3F_4$ manifold, the method comprising:
   (A) pumping the gain medium with a pump beam at a pump wavelength of less than about 820 nm so as to stimulate emission of light from the thulium at an output wavelength of about 800 nm to about 850 nm via a laser transition in the thulium from the $^3H_4$ manifold to the $^3H_6$ manifold; and
   (B) limiting a population of the thulium in the $^3F_4$ manifold to a predetermined level so as to mitigate accumulation of the thulium in the $^3F_4$ manifold via relaxation of the thulium from the $^3H_4$ manifold.

2. The method of claim 1, wherein the pump wavelength is about 770 nm to about 810 nm.

3. The method of claim 2, wherein (A) further comprises: coupling the pump beam into a waveguide containing at least a portion of the thulium.

4. The method of claim 1, wherein the pump beam comprises a first pulse of electromagnetic radiation, and
   (B) further comprises setting a duration of the first pulse to be less than a lifetime of the $^3F_4$ manifold.

5. The method of claim 4, wherein:
   (A) further comprises pumping the thulium with a second pulse of electromagnetic radiation, and
   (B) further comprises setting a period between the first pulse and the second pulse to be greater than the lifetime of the $^3F_4$ manifold.

6. The method of claim 4, wherein (A) further comprises generating the first pulse at a pulse energy of about 1 μJ per pulse to about 1 kJ per pulse.

7. The method of claim 1, wherein:
   the crystalline material is doped with at least one co-dopant, and
   (B) further comprises transferring energy from thulium in the $^3F_4$ manifold to the co-dopant so as to cause the thulium in the $^3F_4$ manifold to transition from the $^3F_4$ manifold to the $^3H_6$ manifold.

8. The method of claim 1, wherein (B) further comprises: stimulating emission of light from the gain medium at a wavelength of about 2 microns so as to reduce the population of thulium in the $^3F_4$ manifold.

9. The method of claim 1, wherein:
   the crystalline material is doped with at least one co-dopant, and
   (B) further comprises exciting thulium in the $^3F_4$ manifold to the $^3H_4$ manifold via energy transfer from the co-dopant.

10. The method of claim 1, wherein (B) further comprises:
    selecting the crystalline material to have a phonon cut-off energy of less than about 700 cm$^{-1}$ so as to reduce a rate of non-radiative relaxation of the thulium from the $^3H_4$ manifold to the $^3F_4$ manifold.

11. The method of claim 10, wherein (B) further comprises:
    selecting the crystalline material to be doped with the thulium at a concentration of about $1 \times 10^{18}$ cm$^{-3}$ to about $3 \times 10^{20}$ cm$^{-3}$ so as to reduce a cross-relaxation rate of the thulium from the $^3H_4$ manifold and the $^3H_6$ manifold to the $^3F_4$ manifold.

12. The method of claim 1, wherein (B) further comprises:
    cooling the crystalline material to a temperature of less than about 200 K so as to limit the population of the thulium in the $^3F_4$ manifold.

13. The method of claim 1, wherein (B) further comprises:
    moving the pump beam with respect to the crystalline material so as to pump the thulium in different portions of the crystalline material.

14. The method of claim 1, further comprising:
    (C) modulating a quality factor of a cavity containing the thulium so as to stimulate pulsed emission of the light in (A).

15. A laser comprising:
    a crystalline material doped with thulium having a $^3H_4$ manifold, a $^3H_6$ manifold, and a $^3F_4$ manifold; and
    a pump source, in optical communication with the crystalline material, to pump the thulium from the $^3H_6$ manifold to the $^3H_4$ manifold with a pump beam at a pump wavelength of less than about 820 nm so as to stimulate emission of light at an output wavelength of about 800 nm to about 850 nm,
    wherein at least one of the crystalline material and the pump source is configured to limit a population of the thulium in the $^3F_4$ manifold to a predetermined level so as to mitigate accumulation of the thulium in the $^3F_4$ manifold via relaxation of the thulium from the $^3H_4$ manifold.

16. The laser of claim 15, wherein the crystalline material comprises a polycrystalline material.

17. The laser of claim 15, wherein the crystalline material comprises at least one of YAG, YAlO$_3$, GdVO$_4$, YVO$_4$, YLF, Y$_2$O$_3$, LaF$_3$, BaY$_2$F$_8$, Y$_2$SiO$_5$, KY(WO$_4$)$_2$, LaF$_3$, YCa$_4$O(BO$_3$)$_3$, LiNbO$_3$, and isomorphs thereof.

18. The laser of claim 15, wherein the crystalline material has a phonon cut-off energy of less than about 700 cm$^{-1}$ so as to reduce a rate of non-radiative relaxation of the thulium from the $^3H_4$ manifold to the $^3F_4$ manifold.

19. The laser of claim 18, wherein the crystalline material is doped with the thulium at a concentration of about $1 \times 10^{18}$ cm$^{-3}$ to about $3 \times 10^{20}$ cm$^{-3}$ so as to reduce a cross-relaxation rate of the thulium from the $^3H_4$ manifold and the $^3H_6$ manifold to the $^3F_4$ manifold.

20. The laser of claim 15, wherein the crystalline material further comprises at least one co-dopant to receive energy from the thulium so as to cause the thulium to transition from the $^3F_4$ manifold to the $^3H_6$ manifold.

21. The laser of claim 20, wherein the at least one co-dopant comprises at least one of holmium, terbium, europium, samarium, and praseodymium.

22. The laser of claim 15, wherein the crystalline material comprises at least one co-dopant, and the system further comprises:
    another pump source, in optical communication with the crystalline material, to pump the co-dopant so as to cause energy transfer from the co-dopant to thulium in the $^3F_4$ manifold, thereby exciting the thulium to the $^3H_4$ manifold.

23. The laser of claim 22, wherein the at least one co-dopant comprises ytterbium.

24. The laser of claim 15, wherein the pump source is configured to pump the thulium with a first pulse of electromagnetic radiation having a duration less than a radiative lifetime of the $^3F_4$ manifold.

25. The laser of claim 24, wherein the pump source is configured to pump the thulium with a second pulse of electromagnetic radiation separated from the first pulse by a period equal to or greater than a lifetime of the $^3F_4$ manifold.

26. The laser of claim 24, wherein the pump source comprises a flash lamp.

27. The laser of claim 26, wherein the crystalline material comprises at least one of chromium-doped YAG and chromium-doped YAlO$_3$ to absorb at least a portion of the pulsed electromagnetic energy and to transfer at least a portion of the absorbed energy to the thulium.

28. The laser of claim 15, wherein the pump wavelength is about 770 nm to about 810 nm.

29. The laser of claim 15, wherein the laser is further configured for stimulated emission of light at a wavelength of about 2 μm from the thulium so as to reduce the population of the $^3F_4$ manifold.

30. The laser of claim 15, further comprising:
a cooling device, in thermal communication with the crystalline material, to cool the crystalline material to a temperature of less than about 200 K so as to limit the population of the thulium in the $^3F_4$ manifold.

31. The laser of claim 15, further comprising:
a waveguide, formed in the crystalline material and containing at least a portion of the thulium, to guide the pump beam through the at least a portion of the thulium.

32. The laser of claim 15, further comprising at least one of:
a translation stage, in mechanical association with the crystalline material, to move the crystalline material with respect to the pump beam so as to pump the thulium in different portions of the crystalline material; and
a beam deflector, in optical communication with the pump beam, to move the pump beam with respect to the crystalline material so as to pump the thulium in different portions of the crystalline material.

33. The laser of claim 15, further comprising:
a Q-switch, in optical communication with the crystalline material, to modulate a quality factor of a cavity containing the thulium.

34. The laser of claim 33, wherein the Q-switch comprises at least one optical element doped with at least one of vanadium, cobalt, and chromium.

35. A laser comprising:
a gain medium comprising:
(i) a crystal host having a phonon cut-off energy of equal to or less than about 700 cm$^{-1}$; and
(ii) thulium doped into the crystal host at a concentration of about $1 \times 10^{18}$ cm$^{-3}$ to about $3 \times 10^{20}$ cm$^{-3}$, wherein the thulium has a $^3H_4$ manifold, a $^3H_6$ manifold, and a $^3F_4$ manifold;
a pump source, in optical communication with the gain medium, to pump the gain medium at a wavelength of about 770 nm to about 810 nm so as to excite the thulium from the $^3H_6$ manifold to the $^3H_4$ manifold, thereby stimulating emission of light at a wavelength of about 800 nm to about 850 nm; and
a cooling device, in thermal communication with the gain medium, to cool the gain medium to a temperature of less than about 200 K so as to limit a population of the thulium in the $^3F_4$ manifold.

* * * * *